Dec. 11, 1962   R. L. DEGA   3,068,016
HIGH TEMPERATURE SEAL
Filed March 31, 1958   2 Sheets-Sheet 1

COPPER-
NICKEL-
BORON
NITRIDE

INVENTOR.
Robert L. Dega
BY
J. N. Shampo
ATTORNEY

Dec. 11, 1962   R. L. DEGA   3,068,016
HIGH TEMPERATURE SEAL
Filed March 31, 1958   2 Sheets-Sheet 2
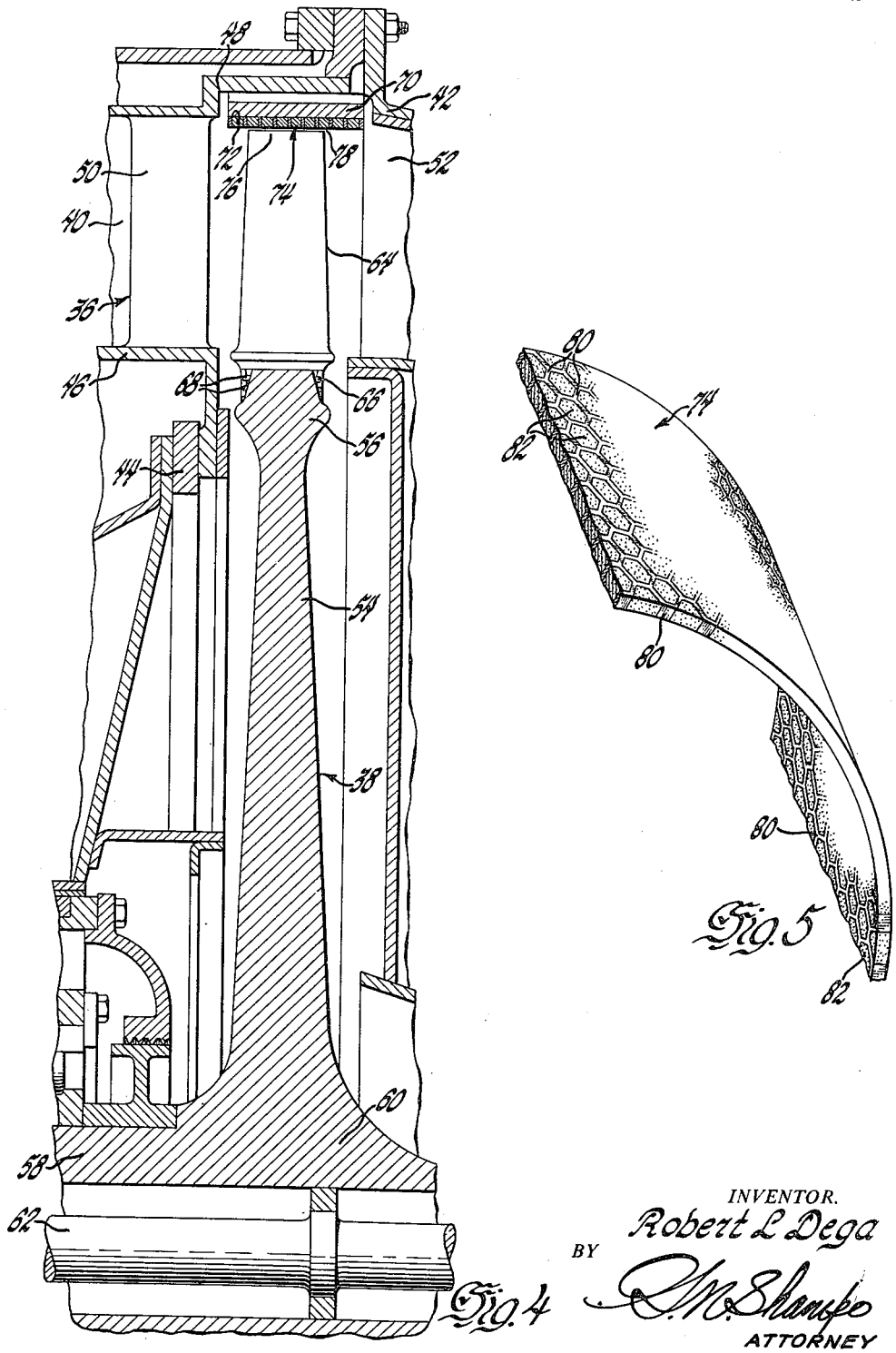
INVENTOR.
Robert L. Dega
BY
J. N. Shampo
ATTORNEY

United States Patent Office 3,068,016
Patented Dec. 11, 1962

3,068,016
HIGH TEMPERATURE SEAL
Robert L. Dega, Utica, Mich., assignor to General Motors Corporation, Detroit, Mich., a corporation of Delaware
Filed Mar. 31, 1958, Ser. No. 724,970
2 Claims. (Cl. 277—96)

This invention relates to a low friction abradable material which is resistant to oxidation at elevated temperatures and more particularly to high temperature abradable type seals which are especially suitable for gas turbine engines.

Heretofore, the use of abradable type seals has generally been limited to low temperature applications. This limitation has primarily been due to the lack of a suitable low-friction readily abradable seal facing material which is resistant to oxidation at elevated temperatures. With the advent of gas turbine engines, for example, the need for high temperature seals has greatly increased. Although abradable type seals can be effectively employed in gas turbine engines, the extremely high temperatures achieved therein are especially deleterious to the facing materials conventionally used.

Accordingly, it is an object of my invention to provide a low-friction abradable material which is resistant to oxidation at elevated temperatures. By means of this invention an abradable type seal can be formed which is resistant to the deleterious effects of high temperatures. Moreover, this invention provides the means whereby an abradable type shaft seal having a high temperature low friction oxidation-resistant abradable facing material can be formed. Moreover, this invention provides a novel gas turbine engine rotor blade tip clearance material which is resistant to oxidation at elevated temperatures.

By means of this invention various types of abradable seals can be formed which are useful under high temperature conditions. A powdered metal mixture containing quantities of boron nitride is compressed under a suitable pressure into a honeycomb-type matrix of suitable high temperature metal. The compressed powdered metal mixture which fills the interstices of the matrix is sintered for a suitable time to alloy the materials of the mixture and bond the sintered metal to the walls of the matrix. The filled matrix is then secured to a suitable backing material so that it may be used in an abradable type seal.

Other objects, features and advantages of the present invention will become more apparent from the following description of preferred embodiments thereof and from the drawings, in which:

FIGURE 4 is a longitudinal sectional view of a portion of a gas turbine engine embodying a turbine rotor and an enclosing turbine housing; and FIGURE 5 is a perspective view of an enlarged annular abradable rotor blade tip clearance material used in the seal assembly shown in FIGURE 4.

Figures 1, 2, 3:
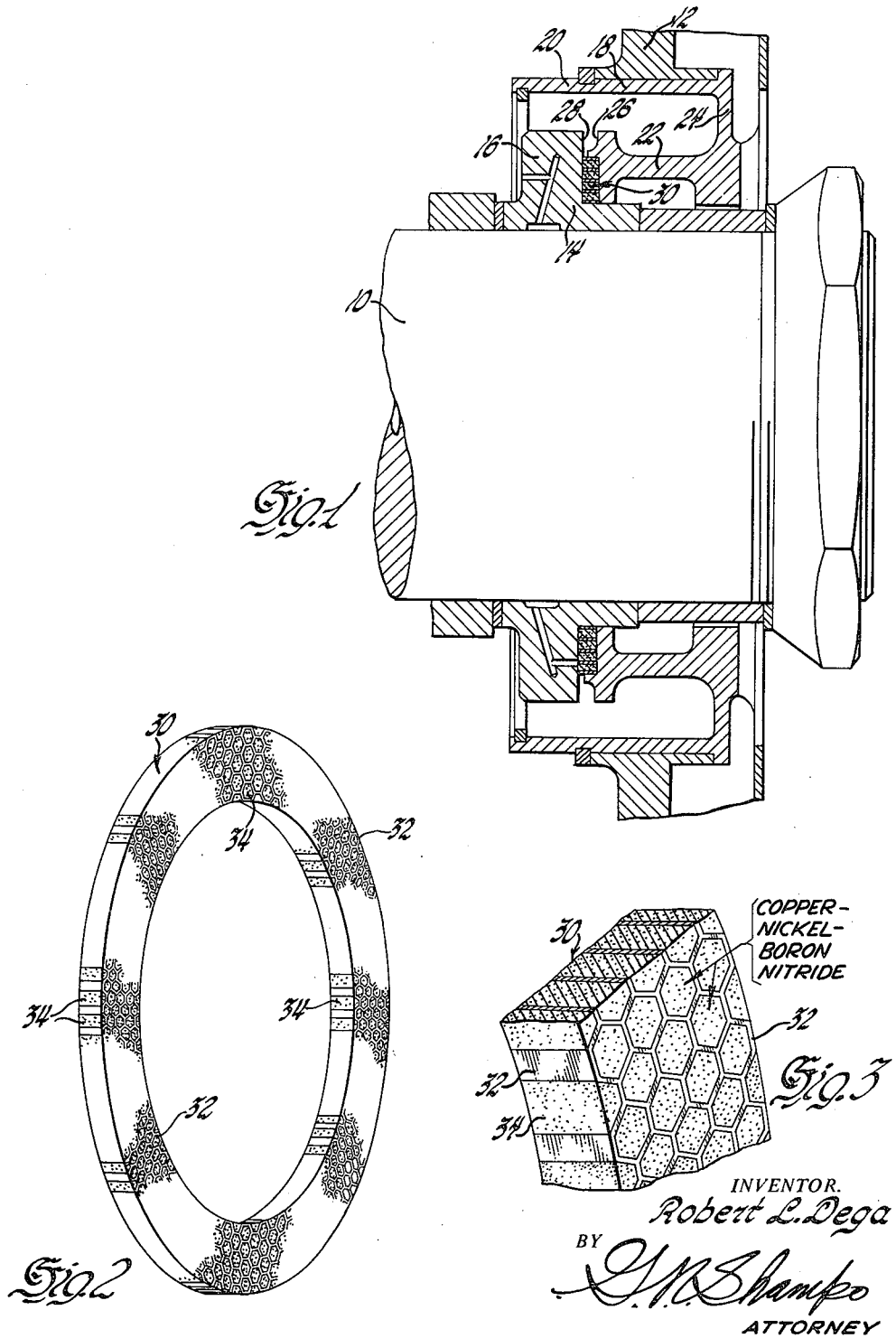
FIGURE 1 is a fragmentary sectional view with parts in elevation of an abradable type composite shaft seal assembly.
FIGURE 2 is a perspective view showing an annular abradable seal facing used in the seal assembly of FIGURE 1.
FIGURE 3 is an enlarged fragmentary view of a portion of the annular facing material shown in FIGURE 2.

The low-friction high temperature seal material comprises a metal honeycomb of a suitable configuration which is filled with a sintered briquetted powdered metal mixture containing boron nitride. The honeycomb forms a matrix which retains the powdered metal thereby forming a composite facing material. The honeycomb is preferably cleaned in any suitable manner before it is filled with the powdered metal mixture. A honeycomb-type matrix formed from stainless steel, for example, is preferably first degreased in any suitable manner, as by means of an alkali cleaner or by the use of suitable solvents. After degreasing the steel, if severely rusted or scaled, it is preferably pickled in a water solution of hydrochloric acid in the known and accepted manner for such acid cleaning. After pickling the stainless steel honeycomb may be immersed in a flux such as one composed of 32 parts of zinc chloride, 8 parts of ammonium chloride and 60 parts of water, all measurements by weight. The foregoing flux is given as a typical example of the zinc chloride flux which may be used.

After treating the stainless steel honeycomb in the fluxing medium just described, in accordance with a preferred embodiment of the invention, it is given a thin coating of a suitable metal. Any metal which is metallurgically compatible with the matrix metal and the powdered metal mixture can be used provided that it is not subject to excessive oxidation at elevated temperatures. A metal is metallurgically compatible with another metal when it will wet and alloy with the other metal. Superior adhesion of a powdered metal mixture containing boron nitride to the matrix metal can be obtained when employing such a coating. Generally it is preferred to apply a coating of the base metal in the powdered metal mixture to the matrix. For example, a coating of about 0.0002 inch to 0.0004 inch of copper is particularly satisfactory when subsequently filling the matrix with a copper base powdered metal composition. A coating of copper can be applied in any suitable manner, such as by electrodeposition from the cyanide type bath disclosed in United States Patent No. 2,195,454 Greenspan. In general, a coating having a thickness of about 0.0002 inch to 0.0004 inch is sufficient to provide beneficial results.

The thus treated matrix is then placed in a suitable brazing die which previously has been partially filled with a quantity of the powdered metal mixture. Additional quantities of the powdered metal mixture are then introduced into the brazing die over the matrix in sufficient amounts to completely fill the matrix after pressing. Although the matrix can be placed in the die initially and covered with a sufficient quantity of the metal mixture or this latter procedure reversed, it is preferred to employ the former procedure since it permits the use of higher compression pressures without causing deformation of the matrix. The powdered metal mixture is compressed into the matrix under a pressure which is sufficiently high to briquette the powdered metal. The composite seal material formed from the briquetted powdered metal mixture and the metal matrix is then sintered under suitable conditions for a sufficient time to alloy the various constituents of the mixture and bond the powdered metal to the adjacent walls of the honeycomb matrix.

Comprehended by the invention are composite seal facing materials which are formed by compressing powdered metal mixtures containing boron nitride into a suitable metal matrix. Although mixtures of powdered copper and boron nitride can be used to fill the matrix, such a composite facing material is generally too malleable to withstand excessive loading without substantial deformation. In abradable type seals, facing materials which are too malleable tend to deform under excessive loading rather than wear from abrasion as is desired in such seals. Powdered copper mixtures can be strengthened and the malleability thereof reduced by including minor proportions of tin, nickel or aluminum-titanium alloys. Such mixtures are therefore able to withstand higher loading without appreciable deformation.

In general, longer wear of the facing material is obtained if it is resistant to compressive deformation. Hence, it is desirable to fill the honeycomb matrix with a copper base powdered metal mixture containing small amounts of tin, nickel or aluminum-titanium alloys and boron nitride. Minor proportions of tin in a sintered copper mixture not only strengthen the material for severe loading but improve its overall bearing characteristics.

Mixtures of powdered copper with minor proportions of nickel, however, are especially satisfactory for use in an abradable seal since the mixture has a greater friability than other copper base compositions. This latter mixture, due to its friability, is more particularly useful in filling the honeycomb to form a facing material for an abradable type seal. Quantities of boron nitride are mixed with the powdered metal mixture to lubricate the surface of the facing material during high temperature abrasion.

Copper base powdered metal mixtures containing minor proportions of tin can also be used. However, as stated in United States patent application Serial No. 725,426 filed March 31, 1958, now abandoned, entitled "High Temperature Seal," in the names of Robert L. Dega, Richard R. Topel and Eric W. Weinman, filed concurrently herewith, and owned by the assignee of the present invention, mixtures of powdered metal containing minor proportions of tin suffer excessive amounts of expansion during the sintering operation. It is therefore desirable, in such instances, to repeat the briquetting and sintering operations in order to form a resultant product exhibiting less than 1% growth.

The pressure at which the powdered metal can be compressed into the interstices of the matrix during the briquetting operation is quite variable. The specific briquetting pressure employed, however, is a major factor in determining the abradability of the material. Accordingly, it has been found that briquetting pressures of about 10 tons per square inch to 30 tons per square inch are generally satisfactory. In general the upper limit of this range is somewhat restricted by physical limitations of the metal matrix which may be deformed when briquetting under higher pressures.

The temperature at which the briquetted material is sintered and the duration of the sintering affects the maximum useful temperature of the seal material. It appears that oxidation resistance of the seal material is proportional to the amount of mutual diffusion alloying that occurs between the metals of the powdered composition. To obtain maximum corrosion resistance for a particular mixture of powdered metals the composition should be sintered at a suitable temperature for a sufficient time to obtain maximum solution of the metals. The resulting material formed is therefore useful at a higher operating temperature since less of the uncombined lower melting point metal is present. The sintering temperature is not particularly critical and can vary substantially between 300° F. and the melting point of the higher melting point metal. However, sintering temperatures between 1300° F. and 1950° F. and sintering times from one to four hours appear to be highly satisfactory for briquetted powdered copper base powdered mixtures. The duration of the sintering, of course, is generally inversely proportional to the sintering temperature. Optimum corrosion resistance of copper-tin-boron nitride mixtures, for example, is obtained by sintering for one or more hours at a temperature between about 1500° F. and about 1650° F., and more particularly at a temperature of about 1580° F. At this temperature the copper particles are sintered while the tin particles are melted and alloyed with the sintered copper particles. Copper-nickel-boron nitride mixtures, when sintered at a temperature from about 1850° F. to about 1950° F., and more specifically at a temperature of about 1900° F. for three or more hours, exhibit superior corrosion resistance. In general, it is understood that the sintering time can substantially be reduced if a powdered alloy is used as a base material rather than a similar proportional mixture of the powdered metals.

To inhibit corrosion or oxidation of the seal material at the elevated sintering temperatures, it is advantageous to conduct the sintering operation in a non-oxidizing atmosphere. Heating in an atmosphere of cracked ammonia (one part by volume nitrogen and three parts by volume hydrogen) is generally satisfactory for this purpose. Other non-oxidizing atmospheres which can be employed are nitrogen, carbon monoxide, helium, argon or the like.

In most instances it has been found that metal powders having such a particle size that almost all of the powder will pass through a 100 mesh screen and be substantially retained on a 325 mesh screen can be used satisfactorily in most seal materials contemplated by this invention. Since tin melts below a temperature of 500° F., it is considered that the particle size thereof is not particularly critical when sintering above this temperature and can vary considerably up to about a 100 mesh size.

An especially satisfactory abradable type seal facing material which is useful up to temperatures of approximately 1700° F. is formed with a copper-nickel-boron nitride mixture. A powdered metal base material containing about 70% by weight powdered copper and approximately 30% by weight powdered nickel is uniformly blended with 2.65% boron nitride by weight of the powdered metal. A portion of this mixture is introduced into a suitable brazing die and a honeycomb-type matrix is thereafter placed in the die over the layer of base material. Sufficient additional base material is then introduced into the die over the matrix and compressed or briquetted under a pressure of 10 tons per square inch to 30 tons per square inch. The composite facing material is then sintered for about three to four hours at approximately 1900° F. in a cracked ammonia atmosphere.

The sintered facing material thus formed is then bonded to a suitable support for use in an abradable type seal. The bonding of the facing material to its support is not particularly critical provided that a strong joining of the two is effected. Particularly desirable are the methods of joining such materials disclosed in United States patent application Serial No. 724,790 filed March 31, 1958 entitled "Composite Layer Bond and Method of Forming Same" and Patent No. 3,047,938 entitled "High Temperature Bond and Method of Forming Same," owned by the assignee of the present invention and filed concurrently herewith.

The proportions of the powdered metals in the base mixture can be varied depending upon the particular characteristics desired. For example, larger proportions of nickel decrease malleability while increasing friability or abradability. The overall maximum satisfactory operating temperature of the seal material, of course, will depend upon the corrosion resistance and melting point of the particular sintered powdered metal combination which is used. Powdered metal compositions containing a major proportion of copper, about 55% or more by weight, are especially suitable as facing materials at elevated temperatures. For example, a facing material formed from a suitable high temperature metal matrix which is filled with a copper base mixture containing about 10% by weight tin is generally useful up to temperatures of about 1400° F. A similar matrix filled with a copper base material containing nickel, however, can be used satisfactorily at temperatures up to 1700° F. As disclosed in the United States patent application Serial No. 725,297 filed March 31, 1958, now abandoned, owned by the assignee of the present invention and filed concurrently herewith in the names of Richard R. Toepel and Eric W. Weinman, titanium alloy additions can be made to the powdered metal compositions to increase their friability, strength and correspondingly their abradability. It has been found that a facing material which is formed by filling a suitable metal matrix with a powdered metal mixture containing 80% to 95% by weight powdered copper and 5% to 20% by weight tin, when mixed with a suitable amount of boron nitride, is generally satisfactory. Facing materials having an even higher corrosion resistance are formed when the stainless steel honeycomb is filled with a metal powder containing 55% to 85% by weight copper and 15% to 45% by weight nickel when mixed with small amounts of boron nitride. By the term "copper" as used herein, it is to be understood that I intend it to also encompass copper base alloys having properties which make them suitable for use in my invention.

Sufficient boron nitride is uniformly blended with the powdered metal mixture to adequately lubricate the surface of the seal material. A seal material containing sufficient boron nitride to comprise approximately 2% to 6% by weight of the metallic components is usually satisfactory. Larger proportions of boron nitride than 6% by weight of the base material appear to adversely affect the bonding of some of the sintered metal mixtures. In most instances, a preferred mixture would contain about 2.65% boron nitride by weight of the base material. Although the precise particle size of the boron nitride is not particularly critical, it has been found that commercially prepared flocculent boron nitride having an average particle size of approximately one micron is generally useful. It is considered that boron nitride of a somewhat larger particle size can also be used.

Although various types of metal matrixes can be employed, it is preferred to use the commercially available honeycomb-type of structure. As shown in FIGURES 2, 3 and 5, the honeycomb-type of matrix is a perforate structure having many passages of hexagonal cross section transversely extending therethrough in a regular pattern. Since the seal facing material formed with the matrix is used at elevated temperatures, it is preferred to form the matrix from a high temperature oxidation-resistant metal. Metals such as stainless steel and nickel base alloys are especially satisfactory.

The specific dimensions of the honeycomb can be varied. However, it has been found that highly satisfactory results are obtained with a honeycomb in which diametrically opposed walls of the hexagonal passages are about 0.2 inch apart and the thickness of the walls between passages is about 0.003 inch.

My invention is useful in abradable type labyrinthine shaft seal assemblies which are subjected to extreme loading at elevated temperatures. Such seal assemblies can be advantageously used, for example, in gas turbine engines which operate at extremely high temperatures. A typical abradable type shaft seal assembly which can be used in a gas turbine engine is shown in FIGURE 1. The seal assembly encircles a rotatably mounted shaft 10 which extends transversely through a stationary frame 12. An annular follower 14 having a radially extending wall 16 on its circumference is rigidly secured to the rotatable shaft 10. A cylindrical seal assembly housing 18 immovably secured to the frame 12 has an outer circumferential wall 20 which surrounds the follower 14. The housing 18 also has an inner circumferential wall 22 which is joined to the outer wall 20 by means of a radial transversely extending interconnecting end wall 24. The end face 26 of the inner wall 22 of the housing 18 is axially aligned with the wall 16 of the follower 14. Thus, the end face 26 of the inner wall 22 forms an abutment which contacts the adjacent radial surface 28 of the follower 14. As shown in FIGURE 2, the end face 26 is provided with an annulus 30 of a honeycomb type matrix 32 into which a suitable powdered composition 34 has been briquetted and sintered. Mixtures of copper, tin and boron nitride in aforementioned proportions are useful as powdered compositions in making the composite facing for this type of seal. The follower 14, rigidly secured to the shaft 10, is movable therewith. During operation of the turbine engine, axial movement of the shaft 10 brings the follower 14 into abutment with the seal facing material 30. The follower 14 abrades the adjacent surface of the seal material to a sufficient depth to provide a running clearance which forms an effective seal.

The sealing of rotatable members is not only accomplished by means of contacting a radially extending surface. As shown in FIGURE 4, abradable seals are also employed between the turbine rotor blade tips and the surrounding shroud in a gas turbine engine. FIGURE 4 illustrates the turbine portion of a gas turbine engine of known type embodying a stator 36 and a rotor 38 which are disposed between the discharge end 40 of a combustion apparatus (not shown) and the turbine exhaust casing 42 of the engine. The turbine stator 36 is supported from the interior of the engine in a known manner by an annular frame 44 and comprises a flanged inner ring 46 and a stepped offset outer ring 48 between which is mounted an annular row of radially spaced stator vanes 50. The outer ring 48 is supported from the inner ring 46 by the vanes 50 and supports a turbine exhaust duct 52 and a flanged casing 42 which surrounds the discharge end 40 of the combustion apparatus and turbine as shown.

The turbine rotor 38 comprises a wheel having a web portion 54 and a rim portion 56 with an integrally formed hollow shaft 58 which extends axially from the hub or central portion 60 of the wheel. A tie bolt 62 passes through the interior of the hollow shaft. Spaced about the periphery of the rim portion 56 of the wheel is a row of turbine buckets 64. The root 66 of the turbine bucket 64 ordinarily is dovetailed into the periphery of the turbine wheel by means of suitable serrations 68 on the side faces of the root 66 which engage corresponding grooves (not shown) in the rim 56 of the turbine wheel. A fixed shroud ring 70 is provided around the rotor 38 in radial alignment therewith. The shroud may be of a unit structure or segmented if the casing is constructed to be split longitudinally.

The inner cylindrical surface 72 of the shroud ring 70 is lined with a readily abradable facing material 74 which is in radial alignment with the rotor blades 64. Coaction of the rotor blade tips 76 with the abradable material 74 during operation of the engine forms a minimum running clearance 78 between the blade tips 76 and the facing material 74 which functions as an effective seal. In this manner gases must pass almost completely throughout the rotor 38 and cannot enter the exhaust duct 52 without impinging on rotor blades 64.

In accordance with the invention the shroud lining is an annular cylindrical facing material formed from a fabricated metal matrix 80 such as shown in FIGURE 5 having its cavities 82 filled with a suitable sintered briquetted high temperature powdered metal containing boron nitride. Especially satisfactory for applications of this type are mixtures of powdered copper and powdered nickel in the aforementioned proportions mixed with small amounts of boron nitride.

It is understood that although this invention has been described in connection with certain specific examples thereof, no limitation is intended thereby except as defined in the appended claims.

I claim:

1. A labyrinth-type rubbing contact fluid seal comprising two members capable of relative rotational movement, at least one of said members having a circular rubbing contact area, a facing on said circular rubbing contact area, said facing having an open-faced cellular metal framework, said framework having a regular geometric pattern of recesses and a sintered briquetted mixture consisting essentially of 55% to 85% powdered copper, 15% to 45% powdered nickel and 2% to 6% boron nitride, by weight of powdered metal, disposed in and filling said recesses, said framework being in rubbing contact with the other of said members.

2. A labyrinth-type rubbing contact fluid seal comprising two members capable of relative rotational movement, at least one of said members having a circular rubbing contact area, a facing on said circular rubbing contact area, said facing having an open-faced cellular metal framework, said framework having a regular geometric pattern of recesses and a sintered briquetted mixture consisting essentially of 80% to 95% powdered copper, 5% to 20% powdered tin and 2% to 6% boron nitride, by weight of powdered metal, disposed in and filling said recesses, said framework being in rubbing contact with the other of said members.

References Cited in the file of this patent

UNITED STATES PATENTS

| | | | |
|---|---|---|---|
| 899,319 | Parsons et al. | Sept. 22, 1908 |
| 1,068,585 | Hettinger | July 29, 1913 |
| 1,631,493 | Laise | June 7, 1927 |
| 2,048,581 | Weiher | July 21, 1936 |
| 2,116,399 | Marth | May 3, 1938 |
| 2,149,974 | McCormack | Mar. 7, 1939 |
| 2,175,701 | Rose | Oct. 10, 1939 |
| 2,370,242 | Hensel et al. | Feb. 27, 1945 |
| 2,393,116 | McCulloch et al. | Jan. 15, 1946 |
| 2,455,804 | Ransley | Dec. 7, 1948 |
| 2,492,935 | McCulloch et al. | Dec. 27, 1949 |
| 2,652,520 | Studders | Sept. 15, 1953 |
| 2,720,356 | Erwin | Oct. 11, 1955 |
| 2,839,413 | Taylor | June 17, 1958 |
| 2,906,007 | Bibbins | Sept. 29, 1959 |
| 2,930,521 | Koehring | Mar. 29, 1960 |
| 2,963,307 | Bobo | Dec. 6, 1960 |
| 2,964,399 | Macks | Dec. 13, 1960 |

FOREIGN PATENTS

| | | |
|---|---|---|
| 313,026 | Switzerland | Apr. 30, 1956 |
| 407,012 | France | Dec. 20, 1909 |
| 716,553 | Germany | Jan. 23, 1942 |
| 1,145,388 | France | May 6, 1957 |